US009928551B2

(12) United States Patent
Kronwall et al.

(10) Patent No.: US 9,928,551 B2
(45) Date of Patent: *Mar. 27, 2018

(54) COMPUTER-IMPLEMENTED SYSTEM AND METHOD FOR CLEARING A DERIVATIVE TRADE INVOLVING MULTIPLE TRADING EXCHANGES

(71) Applicant: NASDAQ TECHNOLOGY AB, Stockholm (SE)

(72) Inventors: Mattias Kronwall, Järfälla (SE); Cecilia Ståhl, Stavsnäs (SE); Magnus Josefsson, Täby (SE)

(73) Assignee: NASDAQ TECHNOLOGY AB, Stockholm (SE)

( * ) Notice: Subject to any disclaimer, the term of this patent is extended or adjusted under 35 U.S.C. 154(b) by 61 days.

This patent is subject to a terminal disclaimer.

(21) Appl. No.: 15/211,495

(22) Filed: Jul. 15, 2016

(65) Prior Publication Data

US 2016/0321755 A1    Nov. 3, 2016

Related U.S. Application Data

(63) Continuation of application No. 13/719,794, filed on Dec. 19, 2012, now Pat. No. 9,396,497.

(51) Int. Cl.
*G06Q 40/04* (2012.01)
*G06Q 40/06* (2012.01)
*G06Q 30/06* (2012.01)

(52) U.S. Cl.
CPC .......... *G06Q 40/04* (2013.01); *G06Q 30/0601* (2013.01); *G06Q 40/06* (2013.01)

(58) Field of Classification Search
CPC ...... G06Q 40/04; G06Q 40/06; H04L 12/1804
USPC ........................................ 705/35–45
See application file for complete search history.

(56) References Cited

U.S. PATENT DOCUMENTS

| 7,636,682 | B1 * | 12/2009 | MacPherson | ...... G06Q 30/0605 |
| | | | | 705/26.2 |
| 7,725,389 | B1 * | 5/2010 | D'Aquisto | ............. G06Q 20/10 |
| | | | | 705/39 |
| 8,296,217 | B1 * | 10/2012 | Howorka | ............... G06Q 40/06 |
| | | | | 705/35 |
| 8,433,644 | B2 * | 4/2013 | Keith | ..................... G05B 15/02 |
| | | | | 705/35 |
| 9,280,791 | B2 * | 3/2016 | Rooney | ................. G06Q 40/04 |
| 9,396,497 | B2 * | 7/2016 | Kronwall | ............... G06Q 40/04 |

(Continued)

FOREIGN PATENT DOCUMENTS

WO    2008/077193 A1    3/2008

*Primary Examiner* — Mohammad Z Shaikh

(74) *Attorney, Agent, or Firm* — Nixon & Vanderhye P.C.

(57) ABSTRACT

A derivative trade order at a home marketplace is routed to an away market place having a better price for a counter position to the order where it is executed. The executed order triggers creation of a "balance derivative trade" at the home marketplace to balance at a home clearing house the away trade. The home clearing house uses the balance derivative trade to create derivative positions of the balance derivative trade and informs a balancing clearing entity which manages the balance derivative trade obligations. The balance derivative trade order account permits netting and reduced margin benefits for the trading participant. A dual derivative exercise operation allows balance derivative positions to be performed in one day to reduce overnight risk for the clearing entity.

20 Claims, 8 Drawing Sheets

(56) References Cited

U.S. PATENT DOCUMENTS

| | | | |
|---|---|---|---|
| 2003/0033240 A1* | 2/2003 | Balson | G06Q 10/10 705/37 |
| 2004/0128223 A1* | 7/2004 | Kuhn | G06Q 40/04 705/37 |
| 2005/0080703 A1* | 4/2005 | Chiesa | G06Q 40/00 705/36 R |
| 2006/0106707 A1 | 5/2006 | Shetty et al. | |
| 2007/0022041 A1* | 1/2007 | Durkin | G06Q 40/04 705/37 |
| 2007/0118460 A1 | 5/2007 | Bauerschmidt et al. | |
| 2008/0097893 A1 | 4/2008 | Walsky | |
| 2009/0157501 A1* | 6/2009 | Martel | G06Q 30/0236 705/14.36 |
| 2009/0313160 A1* | 12/2009 | Kolten | G06Q 40/04 705/37 |
| 2010/0057608 A1* | 3/2010 | McPherson | G06Q 40/04 705/37 |
| 2010/0191639 A1* | 7/2010 | Johnson | G06Q 40/00 705/37 |
| 2011/0307372 A1* | 12/2011 | Schluetter | G06Q 40/00 705/37 |
| 2012/0005066 A1* | 1/2012 | Keith | G05B 15/02 705/37 |
| 2012/0084191 A1* | 4/2012 | Mintz | G06Q 40/04 705/37 |
| 2012/0197776 A1* | 8/2012 | Studnitzer | G06Q 40/04 705/37 |
| 2012/0271752 A1* | 10/2012 | Mahoney | G06Q 40/04 705/37 |
| 2013/0282549 A1* | 10/2013 | Howorka | G06Q 40/04 705/37 |
| 2014/0012779 A1* | 1/2014 | May | G06Q 40/04 705/36 R |
| 2014/0172663 A1* | 6/2014 | Kronwall | G06Q 40/04 705/37 |

* cited by examiner

COMPUTER-IMPLEMENTED SYSTEM AND METHOD FOR CLEARING A DERIVATIVE TRADE INVOLVING MULTIPLE TRADING EXCHANGES

This application is a continuation of application Ser. No. 13/719,794, filed Dec. 19, 2012 the entire contents of which are hereby incorporated by reference.

TECHNOLOGY OVERVIEW

The technology relates to computer-implemented trading and clearing of derivative trading orders from trading participants.

BACKGROUND

A derivative contract is a contract between two parties that specifies conditions (e.g., dates, resulting values of underlying variables, and amounts) for which payments are to be made between the parties. Some of the common variants of derivative contracts include a forward, which is a non-standardized contract between two parties where payment takes place at a specific time in the future at a current predetermined price; a future, which is a standardized contract to buy or sell an asset on or before a future date at a price specified today; an option, which is contract giving the owner the right, but not the obligation, to buy (in the case of a call option) or sell (in the case of a put option) an asset at a "strike" price at a time specified by the option contract; a warrant, which is a long-dated option and generally traded over-the-counter; and a swap, which is a contract to exchange cash (flows) on or before a specified future date based on the underlying value of currency exchange rates, bonds/interest rates, commodities, stocks or other assets.

Clearing relates to the activities from the time a commitment is made for a contract transaction until it is settled. That clearing time period (the cycle time for completing the transaction) is much longer that the time it takes for the transaction commitment to occur, e.g., a buy-sell match. Clearing itself involves the management of post-trading and pre-settlement credit exposure to ensure that trades are settled in accordance with market rules even if a buyer or seller might become insolvent prior to settlement. Clearing processes include reporting/monitoring, risk margining, netting of trades to single positions, tax handling, and/or default handling.

Settlement is a process where securities or interests in securities are delivered, usually against (in simultaneous exchange for) payment of money, to fulfill contractual obligations arising under financial instrument trades. For example, the settlement date for marketable stocks might be 3 business days after the trade is executed, and for listed options and government securities, it might be 1 day after the execution. As part of performance on the delivery obligations entailed by the trade, settlement involves the delivery of securities and the corresponding payment.

Multiple risks arise for the parties during the settlement time, which are managed by the clearing process. Clearing also typically involves modifying the contractual obligations associated with the trade so as to facilitate settlement. A clearing house is a financial entity that provides clearing and settlement services for financial and commodities derivatives and securities transactions. A clearing house intercedes between two clearing entities (also known as clearing members) in order to reduce the risk that one (or more) clearing participants fails to honor its trade settlement obligations. A clearing house reduces the settlement risks by (1) netting (netting means to allow a positive value and a negative value to set-off and partially or entirely cancel each other out) offsetting transactions between multiple counterparties, (2) requiring collateral or margin deposits, (3) providing independent valuation of trades and collateral, (4) monitoring the credit worthiness of clearing participants, and in many cases, (5) providing a guarantee fund that can be used to cover losses that exceed a defaulting clearing participant's collateral on deposit.

Once a trade is executed by two counterparties, the trade is provided to a clearing house which then "steps" in between the two original traders' clearing firms and assumes the legal counterparty risk for the trade. In derivatives trading markets, the clearing house interposes between buyers and sellers as a legal counterparty, i.e., the clearing house becomes the buyer to every seller and the seller to every buyer. This process of transferring the trade title to the clearing house is typically called "novation." As a result, there is no need to determine the credit-worthiness of each counterparty, and the only credit risk that the participants face is the risk of the clearing house committing a default. Thus, a clearing house assumes the risk of settlement failures and also isolates the effects of a failure of a market participant.

In a derivative market place, in exchange for taking on the counterparty risk, the clearing house requires derivative contract trading participants to provide a certain amount of collateral for each contract. The amount of collateral the trading participants need to provide is often calculated as a margin. As some derivative contracts are mutually exclusive, some contract obligations can be netted when calculating the margin, which means that the trading participant may provide less collateral than if providing collateral for each contract individually.

But a trading participant that wants to trade the same derivative contract on multiple markets, e.g., different trading exchanges, does not enjoy this netting benefit (and thus lower margin requirement) because the clearing houses for the different markets each requires collateral for only one part of the contract rather that both sides of the contract as is the case when a trade is handled at the same marketplace by a single clearing house. This issue arises for example when trade order-routing is used to ensure that trading participants receive the best price across several market places. In this situation, a trading participant cannot be sure at which marketplace an order will ultimately be traded. Another disadvantage in this best price order routing situation is that the trading participant must be a member or associated with a member of multiple clearing houses.

SUMMARY

A derivative trade order at a home marketplace is routed to an away market place having a better price for a counter position to the order where it is executed. The executed order triggers creation of a "balance derivative trade" at the home marketplace to balance at a home clearing house the away trade. The home clearing house uses the balance derivative trade to create derivative positions of the balance derivative trade and informs a balancing clearing entity which manages the balance derivative trade obligations. The balance derivative trade order account permits netting and reduced margin benefits for the trading participant. A dual derivative exercise operation allows balance derivative positions to be performed in one day to reduce overnight risk for the clearing entity.

A first aspect of the technology relates to a computer-implemented method for

A second aspect of the technology relates to a computer server for.

DETAILED DESCRIPTION

Figure 1:
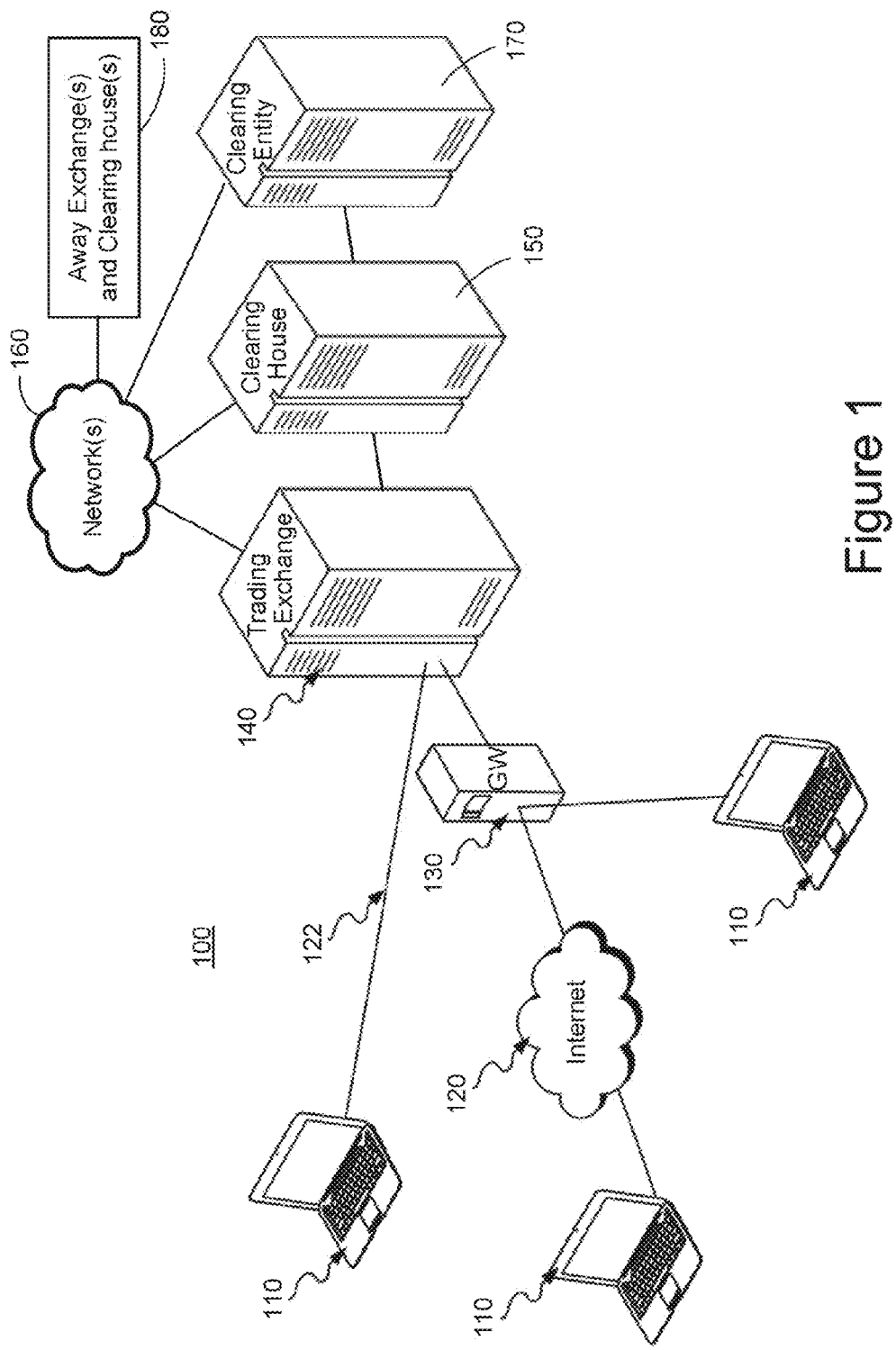
FIG. 1 illustrates a non-limiting example function block diagram showing a computer server-based trading and clearing system.

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on a computer-readable storage medium. and when the instructions are executed by a computer or other suitable processor, the computer or processor performs the functions. Any suitable storage medium or media may be used to store and manage detected financial data. Any suitable storage and access technique(s) and/or format(s) may be used.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., one or more processors and those input devices and output devices that are appropriate to perform the process.

Various forms of computer readable media may be involved in carrying data (e.g., sequences of instructions) to a processor. For example, data may be (i) delivered from RAM to a processor; (ii) carried over any type of transmission medium (e.g., wire, wireless, optical waveguide, etc.); (iii) formatted and/or transmitted according to numerous formats, standards or protocols, such as Ethernet (or IEEE 802.3), SAP, ATP, Bluetooth, and TCP/IP, FIX, Drop Copy, etc.; and/or (iv) encrypted to ensure privacy or prevent fraud in any of a variety of ways well known in the art.

By way of introduction, FIG. 1 is a block diagram of a non-limiting example automated, computer-implemented trading exchange system or platform 100 including trader terminals 110 that are used for issuing order data messages sent to and received by a computer-implemented trading exchange 140 implemented using one or more computers. The trader terminals 110 are connectable, for example over the internet 120 and/or other network, or over some other connection like a dedicated connection 122, to an electronic marketplace, i.e., the computer-implemented exchange 140. The connections in FIG. 1 can be over any suitable communications medium such as wire, wireless, optical waveguide, etc. The computer-implemented trading exchange 140 can be hosted on a computer server or a cluster of computer servers. Sometimes the trader terminals 110 are connected to the computer-implemented trading exchange 140 through an entry gateway 130. The entry gateway 130 may be connected to, or is a part of, the computer-implemented trading exchange 140 and is configured to receive market actions, i.e., orders and/or quotes from the trader terminals 110. An entry gateway 130 usually connects with the computer-implemented exchange 104 on a dedicated network and forwards the market actions to the computer-implemented trading exchange 140 and further usually broadcast updates back to the trader terminals 110. It should however be understood that information being communicated to and from the computer-implemented trading exchange 140 and the trader terminals 101 may be communicated via a single communication path.

While the trading terminals 110 are illustrated as trading terminals that traditionally are associated with manual input of market actions, the trading terminals 110 can also be implemented as algorithmic trading units, sometimes termed automatic order generators, having manual input for control of the algorithmic trading unit. The algorithmic trading unit is pre-programmed with instructions to automatically generate sell and buy orders and quotes (or changes/cancellations thereof) in response to input data received from the computer-implemented exchange 140. The trading terminals 110 also represent market makers inputting quotes to the computer-implemented exchange 140.

The computer-implemented exchange 140 includes or communicates with an associated computer-implemented clearing house 150 including one or more computers that clears executed trades and reports same. The computer-implemented clearing house 150 also communicates with an associated computer-implemented balancing clearing entity 170 including one or more computers (the balancing clearing entity is described below). The automated exchange 140, computer-implemented clearing house 150, and computer-implemented balancing clearing entity 170 are connected via one or more networks 160 to one or more away market places 180 including associated away exchanges and clearing houses.

An advantageous application of the technology relates to trading any type of derivative trade order or contract as described in the background. However, the technology may also be employed with other similar types of trading instruments. The computer-implemented clearing entity, associated with the computer-implemented "home" clearing house, manages clearing accounts (stored at the clearing house) for a home market at a "home" clearing house and away clearing accounts for an away market at an "away" clearing house. In one example embodiment, the system comprises a computer-implemented order router for routing an incoming derivative trade order to the home or away market with the best price for a counter position to execute a trade of the incoming derivative trade order. The routing of an incoming derivative trade order to an away market place triggers the creation and entering of a "balance derivative trade" at the home marketplace to balance at the home clearing house the away trade that is executed in the away marketplace having the best price. Given the balance derivative trade, the home marketplace sends instructions to the home clearing house to create derivative positions of the balance derivative trade in a balance clearing account managed by a balancing clearing entity and in an account of the trading participant instigating the order being routed. When all of the clearing accounts associated with the balance derivative trade have been updated, the home clearing house informs the balancing clearing entity of the balance derivative trade obligations for which the balancing clearing entity is responsible. The balancing clearing entity then balances the balance derivative positions in a balancing account of the home clearing house against the derivative positions resulting from the routed order being matched and executed at the clearing house of the away market. The ultimate effect is that the home clearing house and the balancing clearing entity act with respect to the trading participant at the home marketplace as if the balance derivative trade order was matched at the home marketplace rather than at the away marketplace.

One of the benefits of this approach is that the clearing house, balancing clearing entity, or other node may calculate the margin requirements of the home trading participant and request collateral from the home trading participant as if the derivative trade order were executed in the home exchange, even though the derivative trade order is executed at a different away exchange and cleared and a different "away" clearing house. In other words, the home trading participant benefits by the balancing clearing entity being able to net the trading participant's obligations at the home clearing house, thereby resulting in a lower margin requirement than would be possible without the balance derivative trade order. In turn, the balancing clearing entity pledges collateral (e.g., margin) to the away marketplace clearing house for the derivative trade executed at the away market. Ultimately, the balance derivative trade at the home clearing house enables the trading participant at the home marketplace to have a netted position at the home marketplace irrespective of whether the trade was executed at the home marketplace or the away marketplace.

The technology thus provides for the computer-implemented creation of a "balance derivative trade" at the home marketplace resulting in (1) a "balance derivative position" for a home trading participant's order routed to an away marketplace in a balance account of the home clearing house, and (2) a derivative position for the home trading participant at the home clearing house. As a result, the technology allows for trading participants to trade derivative orders that are "fungible" at any marketplace, i.e., that can be matched at any market place, and to clear matched derivative trade orders that are matched at a home market place or at an away market place. Fungibility means mirroring a derivative instrument and related trading and clearing events that take place at another exchange/clearinghouse.

Allowing trading participants to use a single clearing house allows the positions of those trading participants to be netted when calculating their respective margin requirements, thereby reducing the margin/collateral requirements for the trading participants. The fungible clearing of trading participant derivative trades at various marketplaces means that from the standpoint of clearing house risk, a derivative trade may be made and cleared with the same risk regardless of whether the trade is made at a home market or at an away market.

Figure 2A:
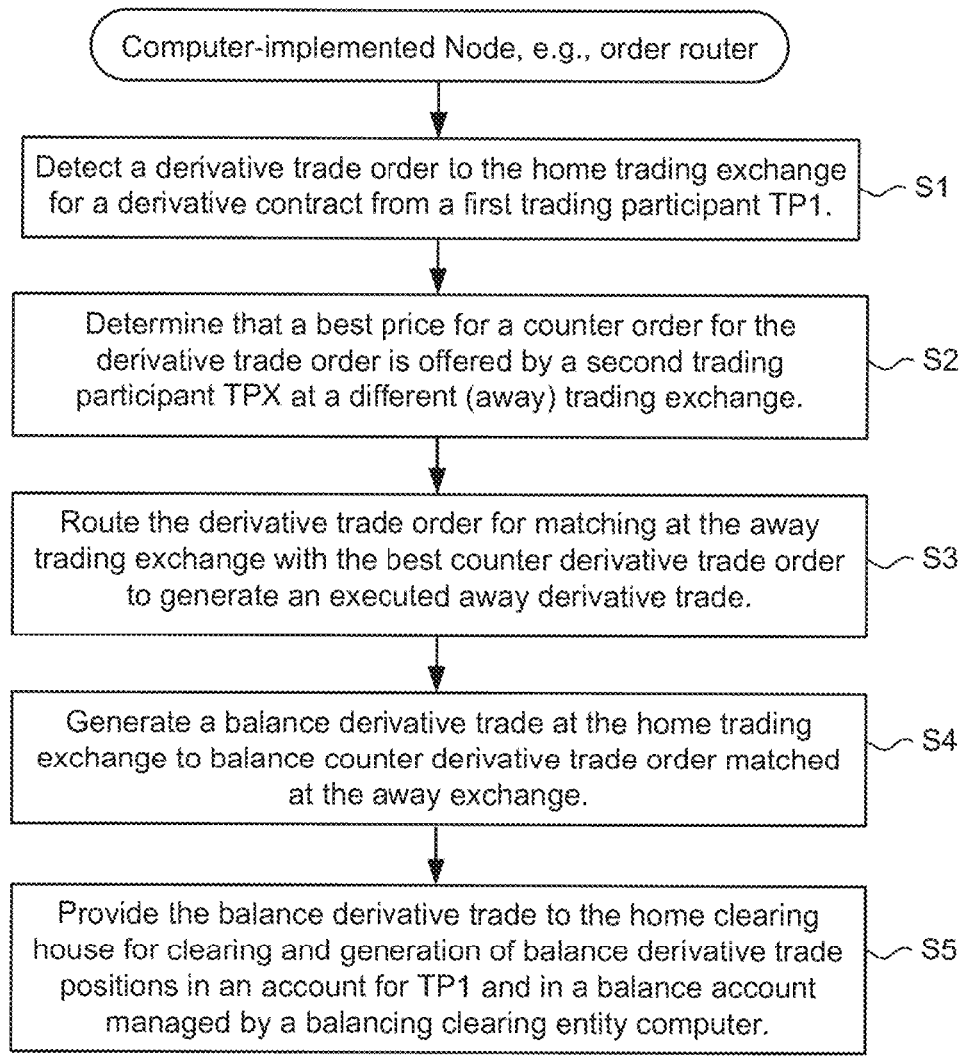
FIGS. 2A and 2B are flowchart diagrams of example procedures for trading and clearing a derivative trade involving multiple trading exchanges.
Figure 2B:
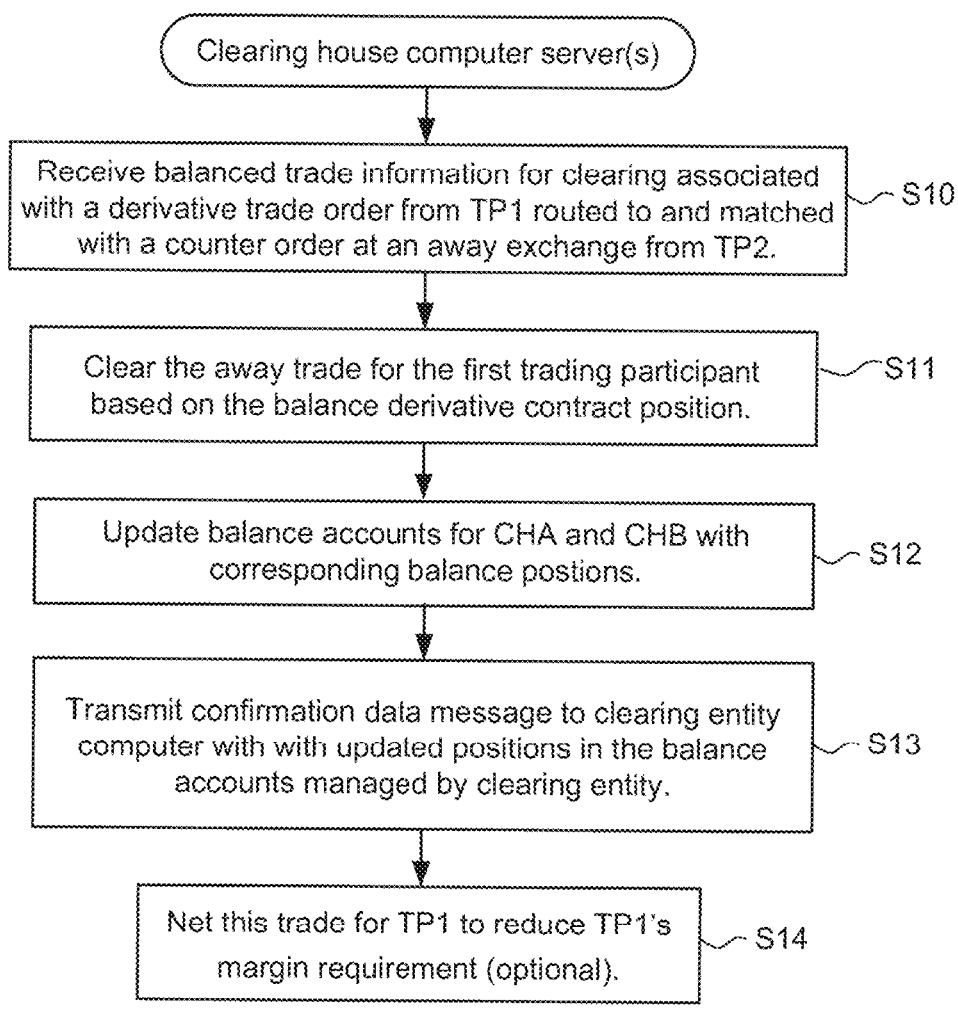

FIGS. 2A and 2B are flowchart diagrams of example procedures relating to trading and clearing a derivative trade involving multiple trading exchanges. FIG. 2A is a flowchart diagram showing example procedures performed by a computer-implemented node associated with a home trading exchange in a home marketplace. One non-limiting example node may be an order router as described in a non-limiting example embodiment below. The node detects a derivative trade order to the home trading exchange for a derivative contract from a first trading participant 1 (TP1) (step S1) and determines that a best price for a counter order for the derivative trade order is offered by another trading participant (TPX) at a different (away) trading exchange (step S2). The derivative trade order is routed for matching at the away trading exchange with the best counter derivative trade order to generate an executed away derivative trade (step S3). The computer-implemented node generates a balance derivative trade at the home trading exchange (step S4) to take into account the derivative trade order matched at the away exchange. The balance derivative trade is provided to the home clearing house for clearing and generation of balance derivate trade positions in an account associated with the first trading participant (TP1) and in a balance account managed by a clearing entity computer (step S5). As a result words, the balancing clearing entity assumes the responsibility for the first trading participant's obligations under the executed away derivative trade.

FIG. 2B is a flowchart diagram showing example procedures performed by a computer-implemented clearing house that is associated with a first trading exchange. The clearing house includes one or more clearing computer servers that receive and store a data message with information relating to a balance derivative trade between the first trading participant TP1 and a balancing clearing entity associated with the home clearing house (step S10). The data message is generated in response to detecting trade confirmation data related to an order submitted by TP1 to the home trading exchange and routed to the away trading exchange where the order was executed. The clearing computer server clears the balance derivative trade (step S11) and updates an account associated with the first trading participant with a balance derivative contract position corresponding to the balance derivative trade and a balance clearing account managed by the balancing clearing entity with a counter balance derivative contract position (step S12). The clearing computer server transmits a confirmation data message, by the clearing computer server, to the balancing clearing entity computer, the confirmation data message comprising information relating to updated positions in the balance clearing account managed by the balancing clearing entity (step S13). The balancing clearing entity has assumed responsibility to fulfill the first trading participant's responsibilities for the executed away trade with respect to the other trading entity (TPX). As a result, the clearing house or other entity will be able to net this trade for the first trading participant (step S14), which means that the margin required for the first trading participant for this trade is reduced. Accordingly, the trade instigated by the first trading participant, although executed at the away trading exchange, is managed and cleared at the home clearing house based on the balance derivative contract position generated in the trading participants account in the home clearing house. Detailed examples of clearing using a balance derivative contract position for a derivative trade at an away exchange are provided below.

Figure 3A:
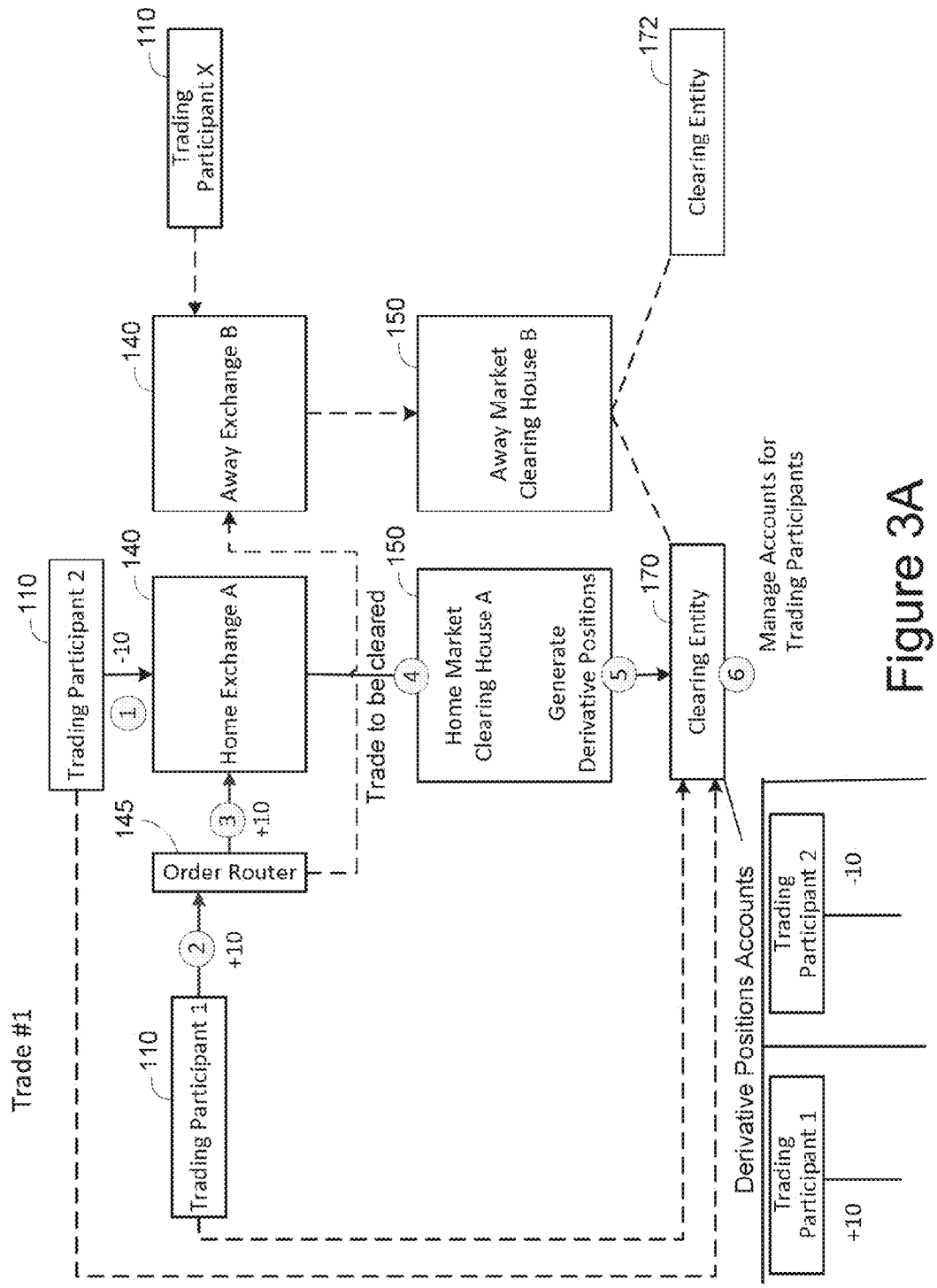
FIG. 3A is a diagram showing a derivative trade executed and cleared within a home exchange.
Figure 3B:
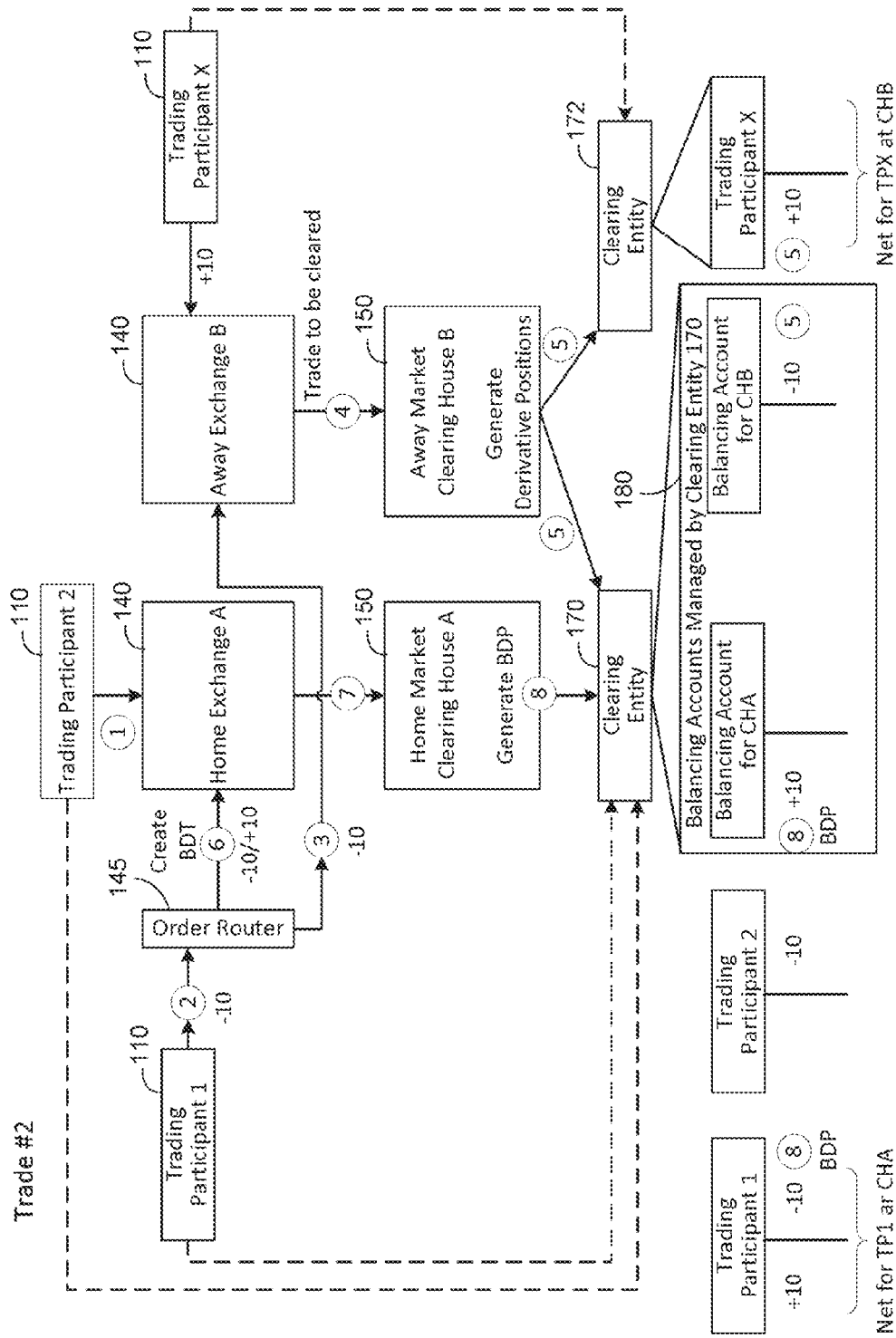
FIG. 3B is a diagram showing a derivative trade executed and cleared within a home exchange and an away exchange in accordance with a non-limiting example embodiment.

FIGS. 3A-3B are diagrams showing non-limiting examples where there is a home trading exchange A having a corresponding clearing house A and an away trading exchange B having a corresponding clearing house B. FIG. 3A shows a first derivative trade situation #1 in which the best price is found at the home exchange A. Initially at step 1, a trading participant 2 (trading participants are labeled with reference number 110), e.g., a market maker, sends a −10 quote to the home exchange A as a derivative contract sell order, and a trading participant 1 sends +10 derivative contract buy order to an order router 150 at step 2. The market maker 110 may of course also send a buy quote to the market. For reference, the derivative contract buy order is an order to buy 10 derivative contracts and the derivative contract sell order is an order to sell 10 derivative contracts, where each contract itself is associated with buy or sell obligations. At step 3, the order router 145 identifies that home exchange A (exchanges are labeled with reference number 140) offers the best matching price, and a trade or deal is executed by the home exchange A. The trade is sent at step 4 to the home market clearing house A (clearing houses are labeled with reference number 150) for clearing. At step 5, a derivative position is generated for trading participant 1 and trading participant 2 at the home clearing house A. In the example, a clearing entity 170 and implemented using one or more computers, manages trading and clearing accounts for the trading participants 1 and 2. Each participant is associated with a respective clearing entity. A market maker can be a member of the clearing house A and manage its own accounts associated with the clearing house A. The dashed lines from trading participants 1 and 2 indicate that each is associated with clearing entity and clear their trades through the clearing entity 170 associated with clearing house A and thus are permitted to trade at exchange A.

At this point, trading participant 1 has a +10 position (bought 10 derivative contracts) and trading participant 2 has a −10 position (sold 10 derivative contracts). When a trading participant owns a derivative position (buy or sell), that means the participant has the right or obligation to buy or sell in accordance with the terms of the matched derivative contract. So trading participant 1 has in the example case of a "buy option" contract being traded, the right to buy 10 contracts worth of the underlying security of the derivative contract on the agreed to date at agreed to price, and trading participant 2 has the obligation to sell 10 contracts worth of the underlying security of the derivative contract on the agreed to date at the agreed to price should trading participant 1 want to exercise his right.

FIG. 3B shows a second derivative trade situation, e.g., occurring on a subsequent trading day, in which the best price is found in an away exchange system at an away exchange B. As for FIG. 3A, the underlying rights/obligations associated with the derivative contracts are not shown or described. Steps 1 and 2 are the same as for FIG. 3A with the exception that trading participant 1 now wants to sell 10 of the same derivative contract. The order router 145 in step 3 routes trading participant 1's (−10) derivative contract sell order to away exchange B which offers a better price for a matching derivative contract buy order for 10 derivative contracts (+10) from a trading participant X labeled 110 trading at away exchange B. Then in step 4, Away Exchange B sends the matched trade to its away clearing house B for clearing. Away exchange B also, while not explicitly shown in FIG. 3B, disseminates match and trade confirmation data detected by the home clearing house A. At step 5, the away clearing house B generates a derivative position in an account for the trading participant X associated with a clearing entity 172, e.g., a member of the away clearing house B, as well as a derivative position in an account associated with trading participant 1 and managed by balancing clearing entity 170. The clearing entity 172 manages the account at the away clearing house B for trading participant X, and the balancing clearing entity 170 manages balance accounts 180 for the home clearing house A (CHA) and for away clearing house B (CHB) described further below.

In step 6, when the order router 145 receives a confirmation of the derivative order match at Exchange B of the routed order, the order router 145 creates a corresponding "balance derivative trade" (BDT) between trading participant 1 and a balancing clearing entity (BCE) 170, which in this example is a trade relating to trading participant 1 selling 10 derivative contracts (−10) and balancing clearing entity Y buying 10 derivative contracts (+10). This creates a trade match in Exchange A between the trading participant 1 and the balancing clearing entity 170, and Exchange A sends that trade match to the home clearing house A for clearing in step 7. In one or more example embodiments, the generated BDT trade may be passed directly to clearing house A for clearing. The clearing house A then generates a balance derivative position (BDP) for trading participant 1 (−10) along with a counter balance derivative position for the balancing clearing entity 170 (+10) and provides that information to the balancing clearing entity 170 in step 8. The home clearing house A does this to balance the away derivative trade that is executed in the away marketplace having the best price. Again, block 180 represents the balance accounts managed by the clearing entity 170 for CHA and CHB. Although shown as a single block for illustration purposes, in practice, the balancing clearing entity 170 manages the balance derivative positions in a balance account at clearing house A and manages the generated position stemming from the routed order matched at the away market in an account at clearing house B. Although the computer-implemented balancing clearing entity 170 is shown as managing the balance clearing accounts 180, it should be appreciated that these balance clearing accounts may be associated with one or more other entities and only managed through clearing entity 170.

A beneficial result at the end of step 8 is that trading participant 1 has a closed position and has closed out its risk for this trade. This also means that trading participant 1 can take advantage of netting for the trade (+10 and −10 cancel each other out) thereby reducing trading participant 1's margin requirement at the home clearing house A as well as the total margin requirement. Another advantage is that there is no need for trading participant A to post additional collateral for a trade executed at clearing house B.

Example embodiments are described above for the computer-implemented order router and the computer-implemented clearing house. However, other computer-implemented nodes may be configured to perform the operations described above for the computer-implemented order router. For example, the computer-implemented balancing clearing entity 170 may create the balanced trade rather than the order router 145. Balancing clearing entity 170 receives home exchange order information from the trading participants 1 and 2 as shown by dashed lines in FIG. 3B. Clearing entity 170 also receives trade information from the order router 145 including when a better away trade has been made at away exchange B. In that case, the balancing clearing entity 170 creates the balance derivative trade and provides that information to the clearing house A to have the balance derivative positions generated in an account associated with the trading participant 1 and a balance account. The clearing house A then provides account information updated with the balance derivative trade position to the balancing clearing entity 170 so it can manage the balance accounts at the home and away clearing houses A and B.

Figure 4A:
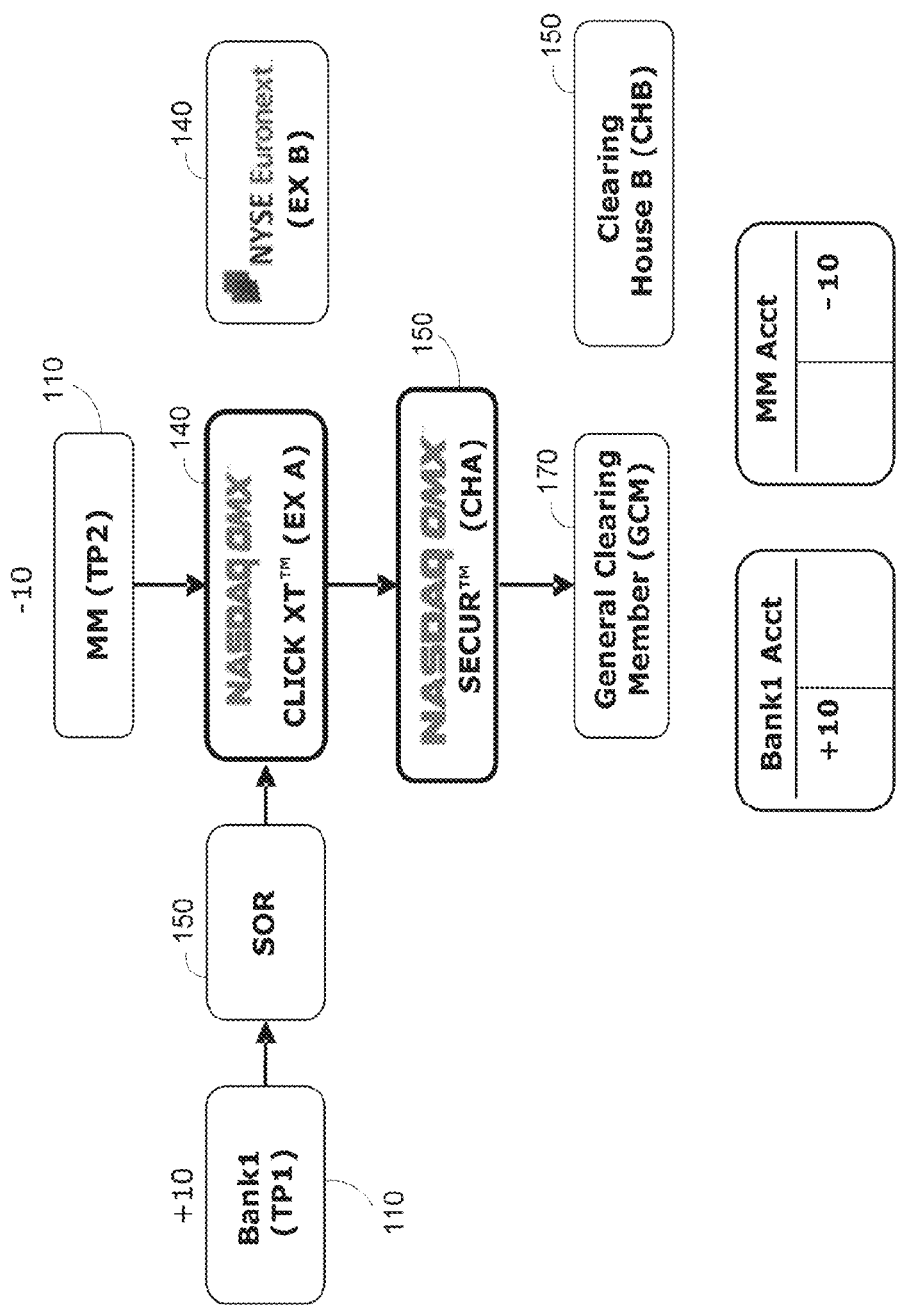
FIGS. 4A-4B are diagrams showing another non-limiting example embodiment showing a derivative trade executed and cleared within a home exchange and an away exchange.
Figure 4B:
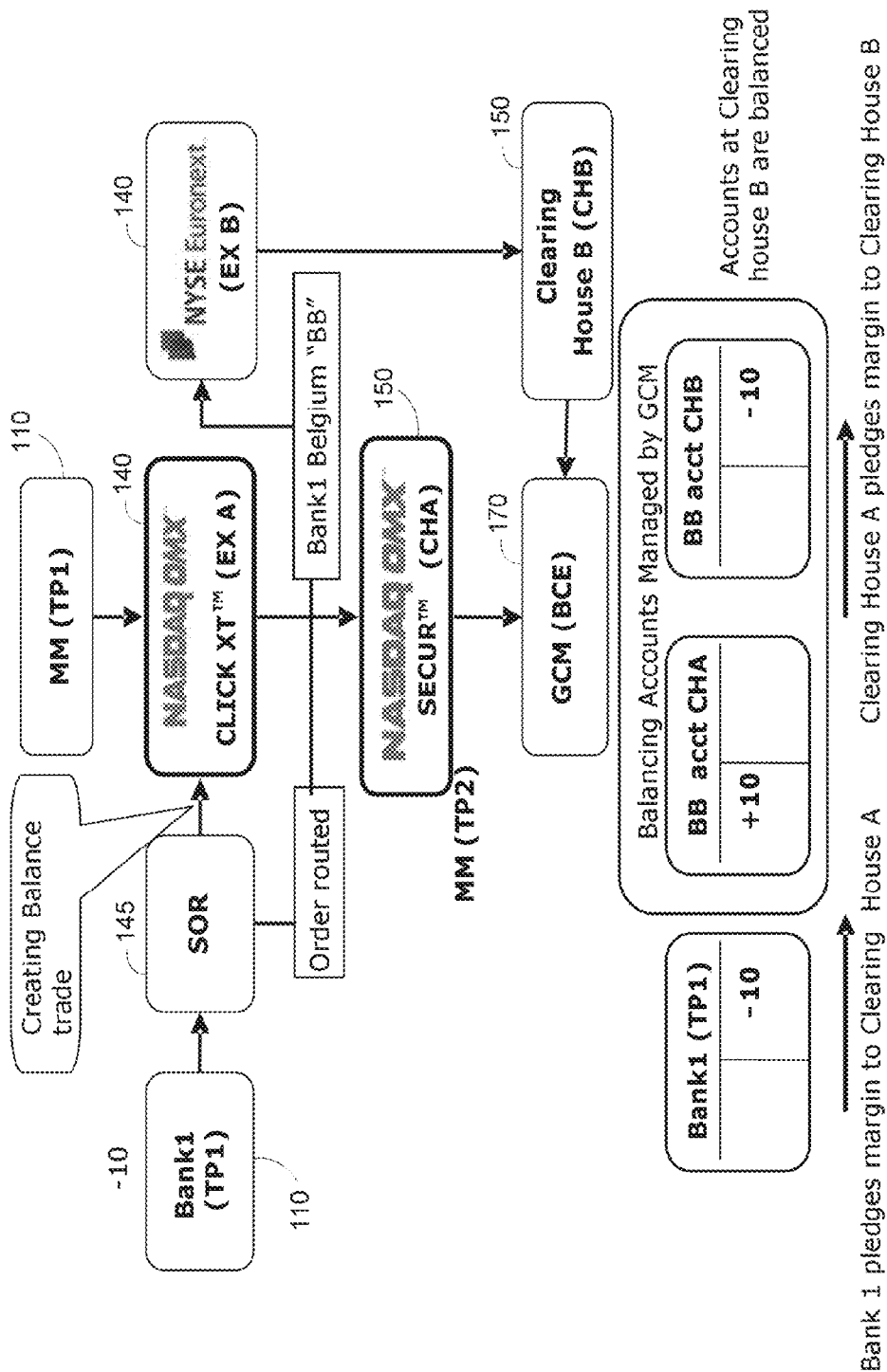

FIGS. 4A-4B are diagrams showing a non-limiting example embodiment showing a derivative trade executed and cleared within a home exchange and an away exchange. FIG. 4A, is similar to FIG. 3A and shows a home exchange trade situation. The trading participant 1 in this example is Bank1 with a +10 derivatives contract order, and the trading participant 2 is a market maker with a −10 derivatives contract order. The order router labeled SOR routes the Bank1 order to the home exchange, NASDAQ OMX CLICK XT™, which matches the orders and sends them for clearing to a home clearing house, NASDAQ OMX SECURE™. The home clearing house creates and sends account update information including changes due to the corresponding derivative positions to a clearing entity labeled GCM (short for General Clearing Member) associated with the home clearing house NASDAQ OMX SECURE™ that manages accounts for Bank1 and MM.

FIG. 4B is similar to FIG. 3B and shows a situation where the best trade is at an away exchange NYSE Euronext 140. The SOR 145 routes Bank1's order to the away exchange NYSE Euronext via trading participant Bank1 Belgium (BB), which is a trading entity affiliated with away exchange NYSE Euronext associated with and engaged to act on behalf of Bank1 at that away market. The SOR 145, upon receiving a match and trade confirmation, creates a balance derivative trade between Bank1 and the balancing clearing entity (BCE) 170, and the home clearing house NASDAQ OMX SECURE™ 150 establishes balance derivative positions for Bank1 and the balancing clearing entity 170, which are communicated to the clearing entity GCM. The balancing clearing entity 170 manages balance accounts at NASDAQ OMX SECURE™ associated with routed orders instigated by Bank1 at the away market exchange NYSE Euronext and manages accounts for "BB" at clearing house B in a setup similar to that described above.

In one example embodiment, Bank1 pledges margin to the home clearing house NASDAQ OMX SECURE™, and the home clearing house NASDAQ OMX SECURE™ pledges margin to the away clearing house B to keep the account at clearing house B associated with the derivative position associated with the routed order in compliance with margin requirements. NASDAQ OMX SECURE™ is responsible for balancing the positions including premiums, margins, and deliveries between NASDAQ OMX SECURE™ and the away clearing house B for the derivative position associated with routed orders.

In another example embodiment, the clearing entity GCM is responsible for balancing the positions including premiums, margins, and deliveries between the balance account at NASDAQ OMX SECURE™ and the account comprising the derivative position generated for a routed order at away clearing house B. In such a scenario, the clearing entity GCM may require a margin from Bank1 for which Bank1 pledges collateral to clearing entity GCM.

Another aspect of the technology relates to the exercise of a derivative position. Consider an option contract owner. That owner has the right to exercise the option contract which requires that the financial transaction specified by the contract to be carried out between the two parties, whereupon the option contract is terminated. When exercising a call option, the owner of the option purchases the underlying shares (or commodities, fixed interest securities, etc.) at the strike price from the option seller, while for a put option, the owner of the option sells the underlying to the option seller, again at the strike price. A clearing house typically gathers exercise requests for an entire day, and after the exchange(s) close, performs one daily exercise run. But this one exercise run per day has disadvantages for away derivative trades for which a balance derivative trade and balance derivative positions are created because all of the obligations involved will likely not be completed in the single exercise run leaving various entities exposed to additional risk. These disadvantages are overcome using a dual exercise run as explained further below.

Consider the away exchange trade example in FIG. 3B. Looking at the balance accounts 180, the clearing entity Y has a +10 position at the home clearing house A and a −10 position at the away clearing house B. If an owner of a derivative contract position at either clearing house requests exercise of the rights or obligations in such a derivative contract, one of the balance accounts may be "hit" during the execution of such exercise request, i.e., during an exercise run. In order to manage the risk, the balancing clearing entity faces if one of the balance accounts is hit during an exercise run, the balancing clearing entity monitors the outcome of exercise runs. The risks can be reduced if the balancing clearing entity receives exercise outcome information from the either clearing house in sufficient time to take action at the other clearing house. If exercise operations for the balance accounts performed at the right time, then the balancing clearing entity can manage the obligation risk for the exercised derivative position. That means that the balance derivative position generating steps 5 and 8 in FIG. 3B must be synchronized. But in many marketplaces, such synchronization is not available, which means that the balancing clearing entity may end up in a situation where it must buy or sell shares in the market in order to fulfill its obligations towards a clearing house.

Since information regarding the outcome of a derivative contract exercise/assignment is typically produced in the evening, it is not possible for balancing clearing entity to predict the outcome of a derivative contract exercise/assignment. Still, the balancing clearing entity is responsible for the derivative position at the away clearing house B. When a trade at clearing house B associated with a balanced trade is hit during a derivative exercise calculation, the balancing clearing entity balancing the account of trading participant 1 must exercise the corresponding position at clearing house A. But if the exercise run and related calculations at the clearing house A are completed for the evening, the balancing clearing entity cannot accomplish this. In this scenario, the clearing entity is responsible for the obligations at clearing house B without having the ability to offset the risk associated with the obligations by requesting exercise of corresponding position held at clearing house A until the next day. Accordingly, a second exercise calculation run is performed for balance accounts so that the balancing act can be performed to remove the overnight risk for the clearing entity.

Figure 5:
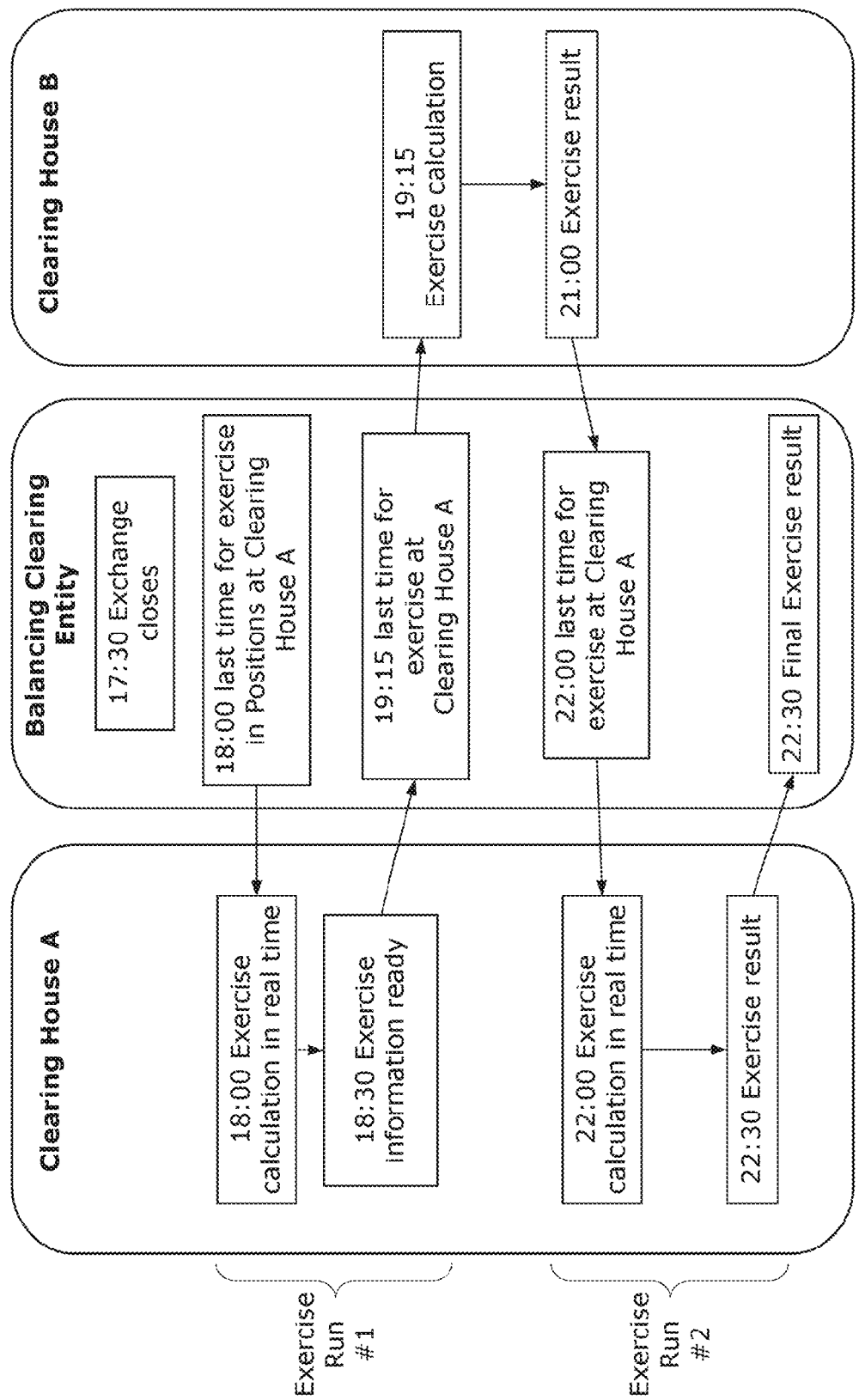
FIG. 5 is a diagram showing a non-limiting example of a clearing house performing dual derivative contract "exercise" operations that involve balance derivative positions.

Consider the non-limiting derivative position exercise example shown in FIG. 5. Typical clearing systems generate exercise/assignment information in the evening. Again, to exercise means to transform a derivative position obligation into a current requirement. The balancing clearing entity, and any other clearing entity associated with the home clearing house A, may issue an exercise request to the clearing house A up until 18:00. After the derivative trade was cleared at steps 5 and 8 in FIG. 3B, the trade counterparties are detached from each other, and the clearing house A has no specific counterparty against which it can exercise the obligation. Thus, on receiving an exercise request the clearing house A selects among all available counter parties to perform the exercise. Namely, the clearing house A assigns one counterparty from among all available counterparties for the same financial instrument and exercise the obligations. In a typical implementation, the clearing house A selects among the accounts associated with counterparties that include such derivatives. In some systems, the assignment of a target account for a derivative exercise is done randomly.

At 18:30, clearing house A updates the clearing accounts to reflect the outcome of the exercise run and provides exercise outcome information to the clearing members clearing entities of clearing house A, including balancing clearing entity. If balancing clearing entity is notified that one of the accounts balancing clearing member manages at clearing house A is hit during the exercise run, then the clearing member might determine to offset obligations by in turn requesting exercise of a corresponding derivative it manages at clearing house B. The balancing clearing entity must make such a determination after being notified of hit on the account, i.e., after the daily exercise run at clearing house A, but prior to the last time for requesting exercise at clearing house B. Prior to 19:15 in the non-limiting example, the balancing clearing entity sends an exercise request to the away clearing house B for exercise of the corresponding instrument at clearing house B. The exercise run at away clearing house B is completed at 21:00 and changes to accounts updated due to the exercise run are reported to the clearing members affected by the exercise run including balancing clearing entity Y.

For an unsynchronized system where the daily exercise runs are done at different times as in the example, balancing clearing entity may have to take on overnight risk associated with the exercised obligations as the daily exercise run at clearing house B are reported after clearing house A has already completed its daily exercise run. With the technology described above, the balancing clearing entity, upon receiving a report from either clearing house A and clearing house B, can be assured of having enough time to offset a hit of an account it manages, even when the clearing houses are unsynchronized. If during the daily exercise run at clearing house B, due to an exercise request of any clearing member associated with clearing house B, an account which the balancing clearing entity manages is hit, that balancing clearing entity sends the home clearing house A an exercise request to perform a second exercise run. The clearing house A performs the second exercise and reports the completed requested exercise to the balancing clearing entity by 22:30. In this way, the exercise of the balance derivative positions at both clearing houses is completed within the same evening so that the balancing clearing entity avoids taking on overnight risk.

There are many advantages to the technology described above. For example, technology allows for trading participants to trade derivative orders that are "fungible" at any marketplace, i.e., that can be matched at any market place, but to also clear matched derivative trade orders, matched at home and away market places, at one computer-implemented clearing house. Allowing trading participants to use a single clearing house allows the positions of those trading participants to be netted when calculating their respective margins. This advantageously reduces the margin/collateral requirements for the trading participants. Furthermore, the technology also allows for "fungible" clearing of trading participants derivative trades at various marketplaces. The dual exercise run features described above reduce the risk faced by a clearing entity when away exchange derivate trades are made and clearing using the balance trade/position technology.

Although various embodiments have been shown and described in detail, the claims are not limited to any particular embodiment or example. None of the above description should be read as implying that a particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

What is claimed is:

1. A method comprising:
    using a processing system, which includes at least one hardware processor, to perform a computer-implemented method comprising:
        receiving, from a first client computer system of a first trading participant that is associated with a first electronic exchange computing system, an electronic data message that includes an instruction for a first order for a derivative instrument, the first electronic exchange computing system being associated with a first clearing house computing system, which is correspondingly affiliated with a balancing clearing entity computing system;
        determining which electronic exchange computing system, from among at least the first electronic exchange computing system and a second electronic exchange computing system, that the electronic data message is to be routed, the first electronic exchange computer system being different from the second electronic exchange computing system;
        routing, in accordance with the determining, the electronic data message to the second electronic exchange computing system to be matched with a counter order for the first order, where a matched trade of the first order to the counter order is cleared via a second clearing house computing system that is associated with the second electronic exchange computing system and different from the first clearing house computing system;

in accordance with a determination that the first order is matched at the second electronic exchange computing system, automatically generating a new electronic data message that includes a newly generated balance trade for the derivative instrument that corresponds to the matched trade, the new electronic data message including data that indicates the newly generated balance trade is between the first trading participant and a balancing clearing entity that is associated with the balancing clearing entity computing system, where data of the newly generated balance trade is separate from the data of the matched first order and the counter order that is cleared via the second clearing house computing system; and sending the new electronic data message to cause the newly generated balance trade to be cleared via the first clearing house computing system.

2. The method of claim 1, wherein the newly generated balance trade mirrors obligations of the matched trade of the first order to the counter order.

3. The method of claim 1, wherein the newly generated balance trade reflects the balancing clearing entity assuming responsibility to fulfill obligations of the first trading participant for the matched trade.

4. The method of claim 1, wherein the computer-implemented method is executed on a data processing node that includes the balancing clearing entity computing system.

5. The method of claim 1, wherein the computer-implemented method is executed on an order router that is in electronic communication with the first electronic exchange computing system.

6. The method of claim 1, wherein the newly generated balance trade is sent to the first clearing house computing system by using the first electronic exchange computer system.

7. The method of claim 1, wherein the computer-implemented method further comprises:

receiving, after routing the electronic data message to the second electronic exchange computing system, a confirmation electronic data message that includes trade confirmation data related to the first order being matched at the second electronic exchange computing system, wherein determination that the first order is matched at the second electronic exchange computing system is based on the received trade confirmation data included in the confirmation electronic data message.

8. The method of claim 1, wherein the computer-implemented method further comprises:

responsive to reception of the electronic data message, determining that the counter order listed on the second electronic exchange computing system has a price field that is better than another counter order that is listed on the first electronic exchange computing system, wherein routing of the electronic data message is based on determination that the counter order listed on the second electronic exchange computing system has a better price field than the another counter order listed on the second electronic exchange computing system.

9. A computer system that is coupled to a first electronic exchange computing system, which is associated with the first clearing house computing system, and an electronic order router, the computer system comprising:

a transceiver configured to receive at least a first electronic message, the electronic order router being configured to (1) determine which electronic exchange computing system, from among at least the first electronic exchange computing system and a second electronic exchange computing system that is different from the first electronic exchange computing system, that an electronic order, which specifies a derivative instrument identifier, is to be routed, the electronic order being submitted, via the electronic order router, to the first electronic exchange computer system by a first client computer system of a first trading participant that is associated with the first electronic exchange computing system, and (2) route the electronic order to the second electronic exchange computing system as a result of the determination, where the routed electronic order is to be matched against a counter electronic order that is listed on the second electronic exchange computing system, a matched electronic trade of the routed electronic order and the counter electronic order being cleared via a second clearing house computing system that is associated with the second electronic exchange computing system;

memory configured to store computer implemented-instructions;

one or more hardware data processors, coupled to the memory, configured to:

based on contents of the first electronic message that indicate that the electronic order was routed to the second electronic exchange computing system or matched at the second electronic exchange computing system with the counter electronic order, automatically generate a new electronic balance trade that is between the first trading participant and a balancing clearing entity that is associated with a balancing clearing entity computing system, where data of the new electronic balance trade is separate from the data of the matched routed electronic order and the counter electronic order that is cleared via the second clearing house computing system; and update electronic record information to indicate that the new electronic balance trade has been executed with respect to the first clearing house computing system.

10. The computer system of claim 9, wherein the new generated balance trade mirrors obligations of the match between the routed electronic order and the counter electronic order of the second electronic exchange computing system.

11. The computer system of claim 9, and wherein the new generated balance trade reflects the balancing clearing entity assuming responsibility to fulfill obligations of the first trading participant for the match of the routed electronic order and counter electronic order executed with respect to the second electronic exchange computing system.

12. The computer system of claim 9, wherein the balancing clearing entity computing system includes the one or more hardware data processors.

13. The computer system of claim 9, wherein the electronic order router is included as part of the first electronic exchange computing system.

14. The computer system of claim 9, wherein the first electronic message is sent from the electronic order router to the computer system for reception by the transceiver thereof.

15. The computer system of claim 9, wherein the first electronic message includes trade confirmation data related to the electronic order being routed to the second electronic exchange computing system.

16. A system comprising:

an order router that includes at least one hardware processor and a transceiver;

an electronic exchange computing system that is coupled to the order router by an electronic communications link, the electronic exchange computing system including the at least one hardware processor configured to match pending electronic data messages stored in a memory with newly received electronic data messages;

a first clearing house computing system that is linked with the electronic exchange computing system, the first clearing house computing system including the at least one hardware processor and configured to perform electronic clearing processing for electronic trades matched by the electronic exchange computing system, the first clearing house computing system affiliated with a balancing clearing entity computing system; and a processing system that includes the at least one hardware processor, the processing system configured to:
receive, via the transceiver of the order router and from a first trading participant computer system that is associated with the electronic exchange computing system, an electronic data message that includes an instruction for a first electronic order for a derivative instrument;

determine whether to route the electronic data message to the electronic exchange computing system or a second electronic exchange computing system that is different from the electronic exchange computing system;

route, in accordance with the determination, the electronic data message to the second electronic exchange computing system to be matched with another electronic data message that includes an instruction for a counter electronic order, the counter electronic order pending with the second electronic exchange computing system, where a match between the first electronic order and the counter electronic order is subsequently cleared via a second clearing house computing system that is different from the first clearing house computing system;

in accordance with determination of a match of the first electronic order at the second electronic exchange computing system, automatically generate a new electronic data message that includes a newly generated balance trade for the derivative instrument that corresponds to the match between the first electronic order and the counter electronic order, the newly generated balance trade being between the first trading participant and a balancing clearing entity that is associated with the balancing clearing entity computing system, the newly generated balance trade being separate from the matched trade of first electronic order to the counter order on the second electronic exchange computing system; and execute the electronic clearing process on the first clearing house computing system for clearing of the newly generated balance trade included in the new electronic data message.

17. The system of claim 16, wherein the at least one hardware processor is a plurality of hardware processors, with at least some of the plurality of hardware processors divided between the order router, the electronic exchange computing system, and the first clearing house computing system.

18. The system of claim 16, wherein the generated new electronic data message is communicated from the order router to the first clearing house computing system.

19. The system of claim 18, wherein the generated new electronic data message is communicated to the first clearing house computing system via the electronic exchange computing system.

20. The system of claim 16, wherein a hardware processor of the order router is configured to automatically generate the new electronic data message.

* * * * *